(12) United States Patent
Ponzo et al.

(10) Patent No.: US 10,409,298 B2
(45) Date of Patent: Sep. 10, 2019

(54) ELECTRONICALLY CONTROLLED REGULATOR

(71) Applicant: Marotta Controls, Inc., Montville, NJ (US)

(72) Inventors: James Ponzo, Montville, NJ (US); Victor Kaminski, Montville, NJ (US); James LaGrotta, Montville, NJ (US)

(73) Assignee: Marotta Controls, Inc., Montville, NJ (US)

( * ) Notice: Subject to any disclaimer, the term of this patent is extended or adjusted under 35 U.S.C. 154(b) by 182 days.

(21) Appl. No.: 15/499,074

(22) Filed: Apr. 27, 2017

(65) Prior Publication Data

US 2018/0314273 A1 Nov. 1, 2018

(51) Int. Cl.
*G05D 16/20* (2006.01)

(52) U.S. Cl.
CPC ...... *G05D 16/2013* (2013.01); *Y10T 137/777* (2015.04); *Y10T 137/7768* (2015.04)

(58) Field of Classification Search
CPC .......... G05D 16/2013; Y10T 137/7768; Y10T 137/7769; Y10T 137/777
USPC .................................. 137/489.5, 492, 492.5
See application file for complete search history.

(56) References Cited

U.S. PATENT DOCUMENTS

| | | | | |
|---|---|---|---|---|
| 4,477,051 A * | 10/1984 | Ben-Yehuda | ......... | F16K 31/402 251/298 |
| 4,917,144 A * | 4/1990 | Giles | ....................... | G05D 16/16 137/488 |
| 4,951,705 A * | 8/1990 | Carey | ................. | G05D 16/0663 137/116.5 |
| 4,961,441 A * | 10/1990 | Salter | .................. | G05D 16/2053 137/14 |
| 5,460,196 A * | 10/1995 | Yonnet | ................ | G05D 16/2093 137/12 |
| 5,586,575 A * | 12/1996 | Bergamini | .......... | F15B 13/0438 137/116.5 |
| 5,660,198 A * | 8/1997 | McClaran | ............ | G05D 16/106 137/10 |
| 5,806,553 A * | 9/1998 | Sidwell | .............. | G05D 16/2013 137/487.5 |
| 6,041,814 A * | 3/2000 | Kouketsu | ............ | F16K 31/1221 137/488 |
| 6,056,008 A * | 5/2000 | Adams | ................ | G05D 16/2093 137/487.5 |
| 6,305,401 B1 * | 10/2001 | Uehara | ............... | G05D 16/2093 137/102 |

(Continued)

*Primary Examiner* — William M McCalister
(74) *Attorney, Agent, or Firm* — Lerner, David, Littenberg, Krumholz & Mentlik, LLP

(57) ABSTRACT

An electronically-controlled pressure regulator includes an inlet through which a gas or liquid is introduced at an inlet pressure, an outlet through which the gas or liquid exits at an outlet pressure, and a valve disposed between the inlet and the outlet, the valve defining a passage including a throat and having a pintle with an enlarged shoulder, the valve movable between a closed configuration in which the enlarged shoulder seals the throat to prevent the gas or liquid from passing from the inlet to the outlet through the valve, and an open configuration in which the gas or liquid can pass from the inlet to the outlet through the valve. In a valve flow path, the enlarged shoulder is disposed between the inlet and the throat. All of the gas or liquid that enters through the inlet can exit through the outlet.

19 Claims, 4 Drawing Sheets

(56) References Cited

U.S. PATENT DOCUMENTS

| | | | | |
|---|---|---|---|---|
| 6,568,416 B2* | 5/2003 | Tucker | ............... | G05D 16/2053 |
| | | | | 137/14 |
| 6,584,999 B2* | 7/2003 | Inayama | ............ | G05D 16/2093 |
| | | | | 137/102 |
| 6,758,233 B2* | 7/2004 | Sulatisky | ............ | F02D 41/0027 |
| | | | | 137/102 |
| 6,779,541 B2* | 8/2004 | Inayama | ............ | G05D 16/2093 |
| | | | | 137/102 |
| 6,903,659 B2* | 6/2005 | Vanderah | ................ | G01F 1/363 |
| | | | | 340/626 |
| 7,533,690 B2* | 5/2009 | Reinicke | ............... | F16K 15/183 |
| | | | | 137/487.5 |
| 7,604,019 B2* | 10/2009 | Frampton | ................ | A62B 7/14 |
| | | | | 128/204.29 |
| 7,766,030 B2* | 8/2010 | Askew | .................... | F15B 5/006 |
| | | | | 137/485 |
| 7,814,750 B2* | 10/2010 | Deeg | ................... | F16H 61/2807 |
| | | | | 60/407 |
| 8,800,593 B2* | 8/2014 | Sakasegawa | ........... | G01F 1/684 |
| | | | | 137/486 |
| 8,910,657 B2* | 12/2014 | Stoever | .............. | G05D 16/2093 |
| | | | | 137/492 |
| 8,967,180 B2* | 3/2015 | Yamauchi | ............ | G05D 16/163 |
| | | | | 137/116.3 |
| 9,062,798 B2* | 6/2015 | Neef | ........................ | F16K 47/04 |
| 9,145,904 B2* | 9/2015 | Griffin, Jr. | ............... | F15B 11/08 |
| 2006/0076061 A1* | 4/2006 | Bush | ......................... | E03D 5/02 |
| | | | | 137/489.5 |
| 2008/0251130 A1* | 10/2008 | Folk | ...................... | F16K 31/365 |
| | | | | 137/14 |
| 2010/0051110 A1* | 3/2010 | Ocondi | ................. | F16K 31/124 |
| | | | | 137/2 |
| 2012/0090702 A1* | 4/2012 | Shalev | ...................... | G01F 1/66 |
| | | | | 137/486 |

* cited by examiner

ELECTRONICALLY CONTROLLED REGULATOR

BACKGROUND OF THE INVENTION

The present invention generally relates to pressure regulation systems, and more particularly to hybrid electronic-mechanical systems that incorporate electronic controls with mechanical regulator capabilities.

Traditional mechanical regulators balance outlet pressure forces against the flow forces on a proportional flow area. As inlet pressure and temperature change, these forces change, but the regulation force (applied by a pressurized dome or spring) remains constant. This results in movement of the system's equilibrium point, and a corresponding change in outlet pressure, which is often called "droop." This error can be a significant portion of the set pressure across the operating range of the regulator. Pressure regulators that are purely mechanical have inherent drawbacks, primarily deviation from set point, or droop, during operation. Secondary sources of error are unit-to-unit variability and accumulated wear throughout operational life resulting in variations of output pressure.

There remains room for improvement in the design and use of pressure regulators, particularly with regard to the ability of such systems to operate efficiently and reliably at high inlet pressures.

BRIEF SUMMARY OF THE INVENTION

A first aspect of the present invention is an electronically-controlled pressure regulator including an inlet through which a gas or liquid is introduced at an inlet pressure, an outlet through which the gas or liquid exits at an outlet pressure, and a valve disposed between the inlet and the outlet, the valve defining a passage including a throat and having a pintle with an enlarged shoulder, the valve movable between a closed configuration in which the enlarged shoulder seals the throat to prevent the gas or liquid from passing from the inlet to the outlet through the valve, and an open configuration in which the gas or liquid can pass from the inlet to the outlet through the valve, wherein in a valve flow path that extends though the valve and from the inlet to the outlet, the enlarged shoulder is disposed between the inlet and the throat.

In accordance with other embodiments of the first aspect, when the gas or liquid flows into the valve, the valve may be biased to the closed configuration. The valve may be biased to the closed configuration when the pintle is acted upon only by the gas or liquid. The regulator may further include a dome having a piston configured to contact the pintle for moving the valve from the closed configuration to the open configuration, and the dome may include a cylindrical wall defining a plurality of apertures therein. The valve may include a cylindrical wall defining the passage in the valve, and the cylindrical wall may have a plurality of apertures to filter the incoming gas or liquid. The throat may be defined by a collar of the valve that is movable within the regulator, such that the collar is self-centering when the gas or liquid flows into the valve.

The regulator may further include a dome having a piston configured to contact the pintle for moving the valve from the closed configuration to the open configuration and a charge valve assembly disposed between the inlet and the dome for supplying gas or liquid to the dome. A dome flow path that extends from the inlet to the dome may be parallel to the valve flow path. The charge valve assembly may be electronically-controlled and may selectively open to channel a portion of the gas or liquid from the inlet toward the dome. The charge valve assembly may be an electronically controlled, piezo-actuated pilot valve.

The regulator may further include a vent valve assembly disposed between the dome and the outlet for selectively permitting gas or liquid to pass from the dome to the outlet. The vent valve assembly may be electronically-controlled and may selectively open to channel the gas or liquid from the dome to the outlet. The vent valve assembly may be an electronically controlled, piezo-actuated pilot valve. All of the gas or liquid that enters through the inlet may exit through the outlet. The regulator may be closed to the environment between the inlet and the outlet. The regulator may further include a transducer in communication with the outlet to measure the outlet pressure. The transducer may be in electronic communication with at least one of the charge valve assembly and the vent valve assembly. The regulator may further include at least three transducers each in communication with the outlet to measure the outlet pressure.

The pintle may have a stem extending from the enlarged shoulder through the throat and configured to contact the piston of the dome. The piston may have an annular deflection surface facing toward the pintle. The annular deflection surface may be disposed within the outlet. The annular deflection surface may be concave.

A second aspect of the present invention is a pressure regulation system including an electronic control system and an electronically-controlled pressure regulator, the regulator including an inlet through which a gas or liquid is introduced at an inlet pressure, an outlet through which the gas or liquid exits at an outlet pressure, and a valve disposed between the inlet and the outlet, the valve defining a passage including a throat and having a pintle with an enlarged shoulder, the valve movable between a closed configuration in which the enlarged shoulder seals the throat to prevent the gas or liquid from passing from the inlet to the outlet through the valve, and an open configuration in which the gas or liquid can pass from the inlet to the outlet through the valve, wherein in a valve flow path that extends though the valve and from the inlet to the outlet, the enlarged shoulder is disposed between the inlet and the throat.

A third aspect of the present invention is an electronically-controlled pressure regulator including an inlet through which a gas or liquid is introduced at an inlet pressure, an outlet through which the gas or liquid exits at an outlet pressure, a valve disposed between the inlet and the outlet, the valve defining a passage including a throat and having a pintle with an enlarged shoulder, the valve movable between a closed configuration in which the enlarged shoulder seals the throat to prevent the gas or liquid from passing from the inlet to the outlet through the valve, and an open configuration in which the gas or liquid can pass from the inlet to the outlet through the valve, a dome having a piston configured to contact the pintle for moving the valve from the closed configuration to the open configuration, and a charge valve assembly disposed between the inlet and the dome for supplying gas or liquid to the dome, wherein all of the gas or liquid that enters through the inlet exits through the outlet.

In accordance with other embodiments of the third aspect, the charge valve assembly may be electronically-controlled and may selectively open to channel a portion of the gas or liquid from the inlet toward the dome. The charge valve assembly may be an electronically controlled, piezo-actuated pilot valve. The regulator may further include a vent valve assembly disposed between the dome and the outlet for selectively permitting gas or liquid to pass from the dome to the outlet. The vent valve assembly may be electronically-controlled and may selectively open to channel the gas or liquid from the dome to the outlet. The vent valve assembly may be an electronically controlled, piezo-actuated pilot valve. The regulator may be closed to the environment between the inlet and the outlet.

A fourth aspect of the present invention is a pressure regulation system including an electronic control system and an electronically-controlled pressure regulator, the regulator including an inlet through which a gas or liquid is introduced at an inlet pressure, an outlet through which the gas or liquid exits at an outlet pressure, a valve disposed between the inlet and the outlet, the valve defining a passage including a throat and having a pintle with an enlarged shoulder, the valve movable between a closed configuration in which the enlarged shoulder seals the throat to prevent the gas or liquid from passing from the inlet to the outlet through the valve, and an open configuration in which the gas or liquid can pass from the inlet to the outlet through the valve, a dome having a piston configured to contact the pintle for moving the valve from the closed configuration to the open configuration, and a charge valve assembly disposed between the inlet and the dome for supplying gas or liquid to the dome, wherein all of the gas or liquid that enters through the inlet exits through the outlet.

A fifth aspect of the present invention is a hybrid mechanical-electronic pressure regulator including an inlet through which a gas or liquid is introduced at an inlet pressure, an outlet through which the gas or liquid exits at an outlet pressure, a valve disposed between the inlet and the outlet, the valve defining a passage including a throat and having a pintle with an enlarged shoulder, the valve movable between a closed configuration in which the enlarged shoulder seals the throat to prevent the gas or liquid from passing from the inlet to the outlet through the valve, and an open configuration in which the gas or liquid can pass from the inlet to the outlet through the valve, a dome having a piston configured to contact the pintle for moving the valve from the closed configuration to the open configuration, a charge valve assembly disposed between the inlet and the dome for supplying gas or liquid to the dome, and a vent valve assembly disposed between the dome and the outlet for selectively permitting gas or liquid to pass from the dome to the outlet.

In accordance with other embodiments of the fifth aspect, in a valve flow path that extends though the valve and from the inlet to the outlet, the enlarged shoulder may be disposed between the inlet and the throat. When the gas or liquid flows into the valve, the valve may be biased to the closed configuration. The valve may be biased to the closed configuration when the pintle is acted upon only by the gas or liquid. A dome flow path that extends from the inlet to the dome may be parallel to the valve flow path. The charge valve assembly may be electronically-controlled and may selectively open to channel a portion of the gas or liquid from the inlet toward the dome. The charge valve assembly may be an electronically controlled, piezo-actuated pilot valve. The vent valve assembly may be electronically-controlled and may selectively open to channel the gas or liquid from the dome to the outlet. The vent valve assembly may be an electronically controlled, piezo-actuated pilot valve. All of the gas or liquid that enters through the inlet may exit through the outlet. The regulator may be closed to the environment between the inlet and the outlet.

A sixth aspect of the present invention is a pressure regulation system including an electronic control system and a hybrid mechanical-electronic pressure regulator, the regulator including an inlet through which a gas or liquid is introduced at an inlet pressure, an outlet through which the gas or liquid exits at an outlet pressure, a valve disposed between the inlet and the outlet, the valve defining a passage including a throat and having a pintle with an enlarged shoulder, the valve movable between a closed configuration in which the enlarged shoulder seals the throat to prevent the gas or liquid from passing from the inlet to the outlet through the valve, and an open configuration in which the gas or liquid can pass from the inlet to the outlet through the valve, a dome having a piston configured to contact the pintle for moving the valve from the closed configuration to the open configuration, a charge valve assembly disposed between the inlet and the dome for supplying gas or liquid to the dome, and a vent valve assembly disposed between the dome and the outlet for selectively permitting gas or liquid to pass from the dome to the outlet.

DETAILED DESCRIPTION

Figure 1:
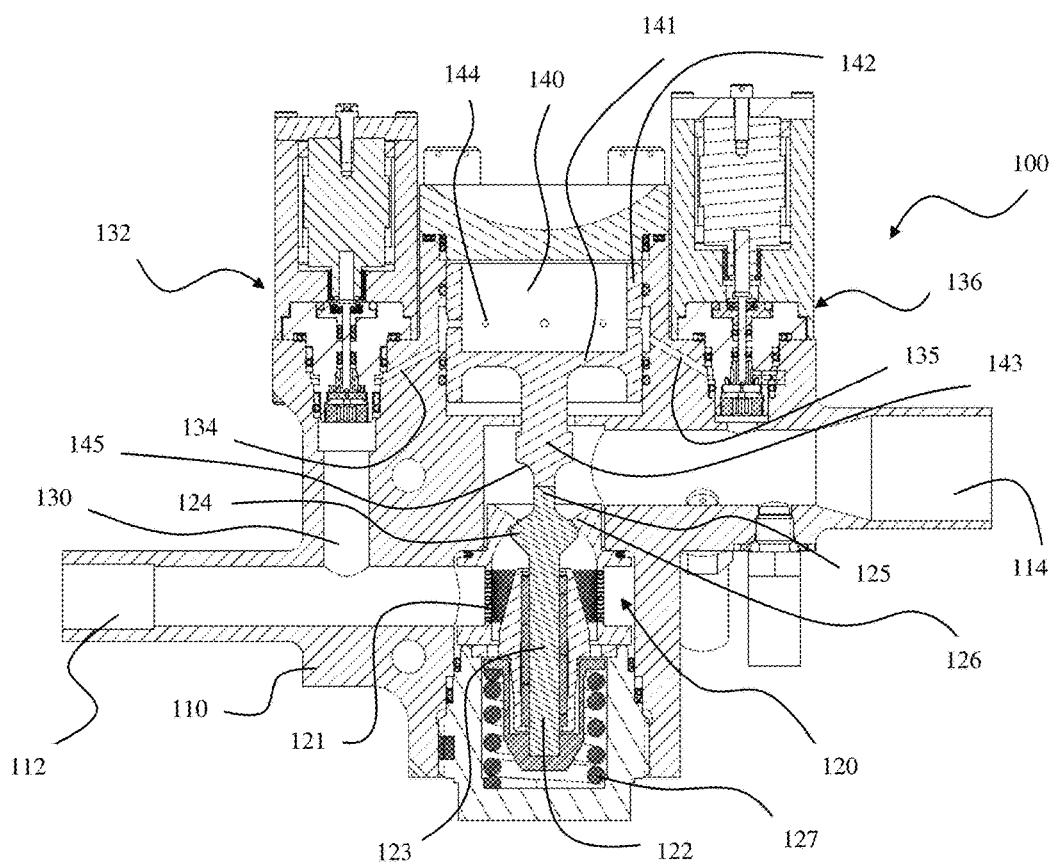
FIG. 1 is a front sectional elevational view of an electronically-controlled regulator in accordance with a first embodiment of the present invention.
Figure 2:
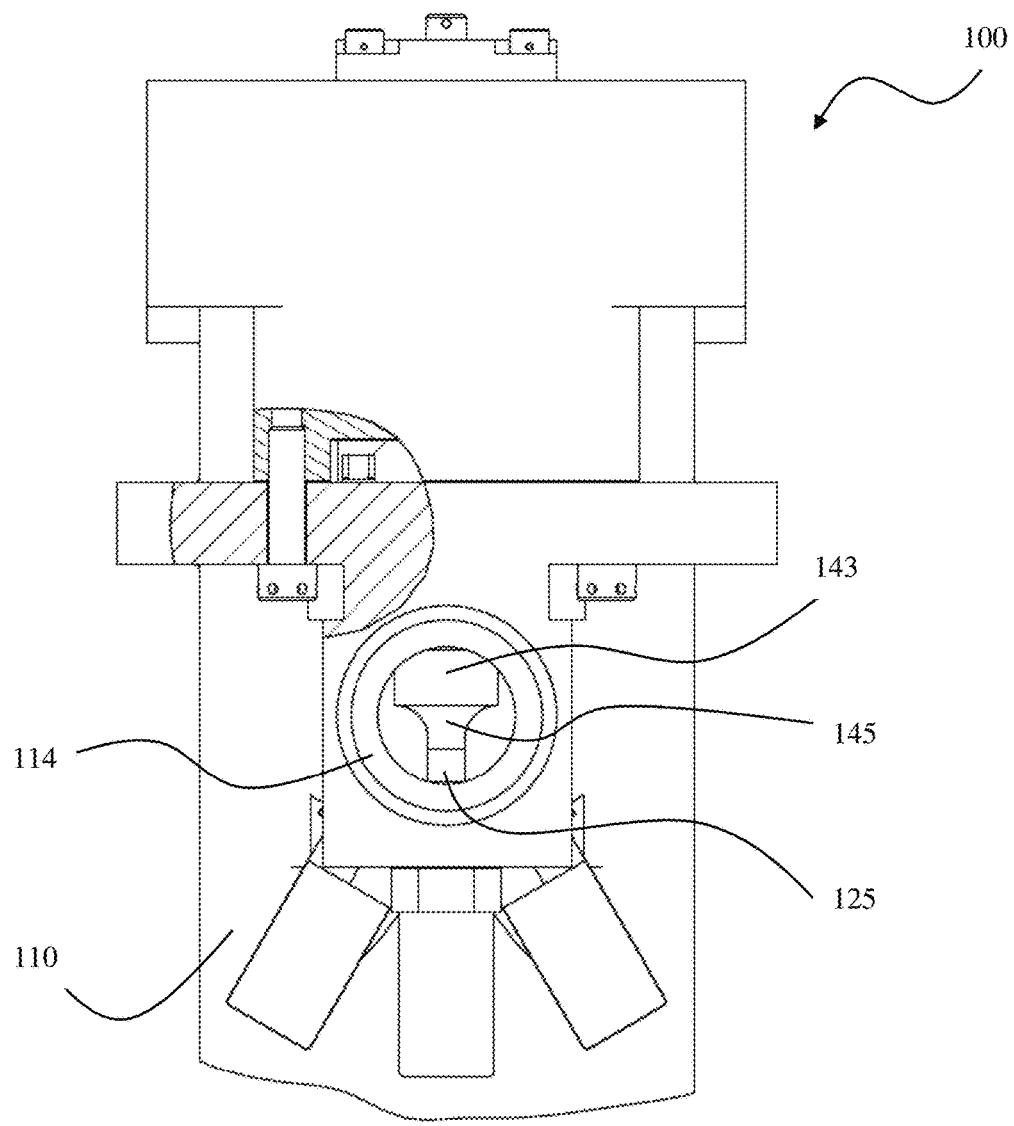
FIG. 2 is a side elevational view of the regulator shown in FIG. 1.

Shown in FIGS. 1 and 2 is an electronically-controlled, piezo-actuated regulator 100. Regulator 100 is a hybrid mechanical-electronic system that tables flexible, accurate, and stable pressure regulation across a large pressure ratio. Regulator 100 is a closed loop electronic control system suitable for widespread industrial application, including spaceflight, defense, and facility applications. In certain examples, regulator 100 can handle inlet pressures of up to about 10,000 psi and mass flows of greater than 5 lbm/s (2.7 kg/s) of Helium and 10 lbm/s (4.5 kg/s) of Nitrogen.

As shown in FIG. 1, regulator 100 includes a body 110 defining an inlet 112 and an outlet 114. A gas is introduced through inlet 112 at an inlet pressure before it passes through body 110 and exits through outlet 114 at an outlet pressure. While the following discussion references a gas as the material passing through regulator 100, liquids are also contemplated for use with regulator 100.

Regulator 100 includes a mechanical valve 120 that handles dynamic, transient stability and pressure reduction/regulation of the gas, and is disposed within body 110 between inlet 112 and outlet 114. Valve 120 defines a passage through which the gas passes from inlet 112. The passage first includes a filter 121 integrated circumferentially into a cylindrical wall of valve 120 and comprising a plurality of apertures through which the gas passes before encountering a pintle 122 movable within the cylindrical wall of valve 120. Pintle 122 is linear in nature so that it extends along an axis with a shaft 123 and a stem 125, and an enlarged shoulder 124 disposed therebetween. Enlarged shoulder 124 interacts with a throat 126 in the wall of valve 120 such that stem 125 extends through throat 126. Throat 126 defines an aperture of a diameter that is less than a diameter of enlarged shoulder 124.

In a closed configuration of valve 120, enlarged shoulder 124 presses against and seals throat 126 to prevent any gas from passing from inlet 112 to outlet 114 through valve 120. Alternatively, in an open configuration of valve 120, enlarged shoulder 124 is separated, at least partially, from throat 126 to provide an annular opening or space, or a portion thereof, through which the gas is able to pass from inlet 112 to outlet 114. Throat 126 can be a component of the cylindrical wall in which filter 121 resides. That wall can be a component, such as a collar, that is movable within body 110 such that the collar self-centers when acted on by gas entering valve 120.

Regulator 100 defines two flow paths for the gas to pass from inlet 112 to outlet 114, one of which is a valve flow path that extends through valve 120. In the valve flow path, enlarged shoulder 124 is disposed between inlet 112 and throat 126. That is, the gas entering valve 120 encounters enlarged shoulder 124 before it encounters throat 126 as it travels through valve 120. In this way, the pressure exerted by the gas tends to force enlarged shoulder 124 into contact with throat 126. Absent an opposing force on pintle 122, the presence of the gas at inlet 112 as the only actor on pintle 122 naturally tends to force enlarged shoulder 124 toward throat 126 so that valve 120 is naturally biased into its closed configuration. Any pressure of the gas will tend to close valve 120, not just the entire inlet pressure. Because regulator 100 is normally closed, it is capable of acting as an isolation valve.

A second flow path defined by regulator 100 is parallel to the valve flow path. This second flow path includes a lumen 130 branching from inlet 112 and leading to a dome charge pilot or charge valve assembly 132. Charge valve assembly 132 is an electronically controlled, piezo-actuated pilot valve that can either seal an opposing end of lumen 130, thereby rendering the second flow path inactive, or open to allow some portion of the gas to travel through lumen 130 and the second flow path.

Gas that passes through lumen 130 then enters a passage 134 to encounter a dome 140 of regulator 100, as shown in FIG. 1. Dome 140 is seated within a cavity of body 110 and includes a baseplate 141, a cylindrical wall 142 disposed about baseplate 141, and a piston 143 extending downward from baseplate 141. Cylindrical wall 142 defines a plurality of apertures 144 about its circumference through which the gas can flow. As the gas passes through passage 134 and into the cavity in which dome 140 is seated, the gas moves into the circumferential space around the outside of cylindrical wall 142 of dome 140. The gas can then fill the space within the cylindrical wall 142 and above baseplate 141 by entering that space via apertures 144. Dome 140 can move vertically within its cavity, as shown in FIG. 1, as explained further below.

Piston 143 is disposed through an opening in body 110 to extend into outlet 114 and into contact with stem 125 of pintle 122. When charge valve assembly 132 is closed so that all gas entering inlet 112 acts on valve 120, valve 120 is in its closed configuration as described above. This in turn causes stem 125 of pintle 122 to force piston 143 of dome 140 upward absent an opposing force on dome 140. Even when no gas is imposed on valve 120 and regulator 100 is at complete rest, a spring 127 of valve 120 forces valve 120 into its closed configuration so that dome 140 is positioned this way. When charge valve assembly 132 allows gas to flow into communication with dome 140, pressure is applied by the gas on baseplate 141 to force dome 140 downward toward pintle 122. Dome 140 moves this way because the cavity in which it is disposed in body 110 has a ceiling that is sealed and secured. When this force overcomes the force acting on pintle 122 due to the gas pressure or the pressure of spring 127, the pintle 122 also moves downward to cause valve 120 to move into its open configuration.

As the gas flowing into regulator 100 through inlet 112 proceeds along the valve flow path through valve 120, selectively operating charge valve assembly 132 can channel a portion of the incoming gas to proceed along the second flow path toward and into communication with dome 140. In this way, charge valve assembly 132 is located between inlet 112 and dome 140, and in parallel with valve 120. Through communication of the pressure values at inlet 112 and outlet 114, charge valve assembly 132 can then selectively allow the gas to pass through this second flow path to balance the competing forces on pintle 122 to thereby achieve a particular value of pressure at outlet 114 or a particular ratio of the pressures at inlet 112 and outlet 114.

Piston 143 is contoured with an annular deflection surface 145 that faces toward pintle 122. The gas exiting valve 120 is in an annular configuration as it passes enlarged shoulder 124, through throat 126, and around stem 125, which is disposed within outlet 114. This annular section of gas then moves upward along piston 143 but must eventually change direction through about 90 degrees to exit through outlet 114. Deflection surface 145 encounters this annular section of gas and diverts it generally radially outward from the axis of piston 143 so that it can more efficiently flow through outlet 114. Deflection surface 145 is concave as shown in FIG. 1, though it can be angled or otherwise contoured to still achieve at least some redirection of the gas it encounters.

The cavity in body 110 in which dome 140 is disposed is sealed to the extent that gas entering dome 140 cannot pass downward past piston 143 and into outlet 114. Rather, the gas is fed into the circumferential space around the outside of cylindrical wall 142 of dome 140 by passage 134 and then out of that circumferential space (either after passing through apertures 144 or not) through another passage 135 and into communication with a dome vent valve or vent valve assembly 136, which is disposed between dome 140 and outlet 114. Vent valve assembly 136 is an electronically controlled, piezo-actuated pilot valve that can open to allow the gas within dome 140 to exit into outlet 114. This is also done selectively so that gas in communication with dome 140 can be maintained to provide a certain desired force on pintle 123 before allowing the gas to be channeled out of dome 140 and into outlet 114. That is, when vent valve assembly 136 is closed or open slightly, it can allow the gas passing through dome 140 to slow so that it acts on dome 140 with a stronger force.

One or more transducers can be provided at outlet 114 to measure the outlet pressure of the gas and to electronically communicate these readings to charge valve assembly 132 and vent valve assembly 136. This allows the valve assemblies 132, 136 to intelligently control the flow of gas through regulator to place appropriate pressure on dome 140, and therefore pintle 123, to maintain a steady, constant output pressure regardless of the value of the inlet pressure, which may fluctuate. In environments in which the inlet pressure is constant, regulator 100 operates to quickly steady and maintain the desired outlet pressure. The operation of electronically-actuated charge valve assembly 132 and vent valve assembly 136 facilitate that the operation can be carried out much more quickly than with previous mechanical regulators.

The transducers are used to allow regulator 100 to constantly measure actual downstream outlet pressure and adjust to changing inlet conditions, which results in an accurate outlet pressure that is insensitive to inlet pressure, flow rate, and temperature. This provides output pressure error correction, wherein accurate/minimal deviation in output pressure is achieved regardless of inlet conditions. This also allows regulator 100 to accommodate a flexible set point, which provides a benefit in that outlet pressure can be varied on command. The system can also generate an output to inform of a regulator fault.

Together, charge valve assembly 132 and vent valve assembly 136 comprise the electronic control system that handles longer time frame deviations, set point, and output pressure. The mechanical-electronic hybrid approach enables very fast, accurate, stable, and scalable operation of regulator 100 without large electronic power or control input. Time averaged power draw is less than 10 W, for example, and peak draw is less than 45 W, for example. By incorporating an electronic control system, the system eliminates the sources of output pressure error, such as the droop described above in connection with traditional purely mechanical regulators. Regulator 100 can deliver a constant output pressure regardless of input conditions. Electronic control of the pilot valves 132, 136 provides smoother corrections.

With the above components of regulator 100 more fully explained, it can be seen that the valve flow path that extends from inlet 112, through valve 120, and into outlet 114. The second flow path through regulator 100 extends from inlet 112 through lumen 130, charge valve assembly 132, passage 134, the circumferential space around the outside of cylindrical wall 142 of dome 140 and likely dome 140 itself via apertures 144, passage 135, vent valve assembly 136, and ultimately back into outlet 114. All of the gas entering regulator 100 through inlet 112 therefore passes through one of the valve flow path or the second flow path such that all of such gas ultimately exits regulator 100 through outlet 114. In this way, regulator 100 is closed to the environment between inlet 112 and outlet 114. Previous commercial designs were not equipped with a feature such as vent valve assembly 136 and were therefore not configured to vent the gas that communicated with a dome back into an outlet of the regulator. Instead, those gasses that communicated with the dome were simply dumped out of the previous regulator designs into the atmosphere or external environment. This potentially harmful exhaust is alleviated, and in fact eliminated, by the incorporation of vent valve assembly 136 and its selective release of all of those gasses or vapors into outlet 114 of regulator 100.

The components of regulator 100 can be made of titanium alloys, stainless steel, alloys, and/or other industrially acceptable metals. Regulator 100 is relatively light in weight, and preferably weighs less than 8.5 lbm (3.9 kg) inclusive of its control electronics and interconnections. Regulator 100 can be constructed to have an Equivalent Sharp Edged Orifice of, for example, about 0.386 inches (9.8 mm).

Figure 3:
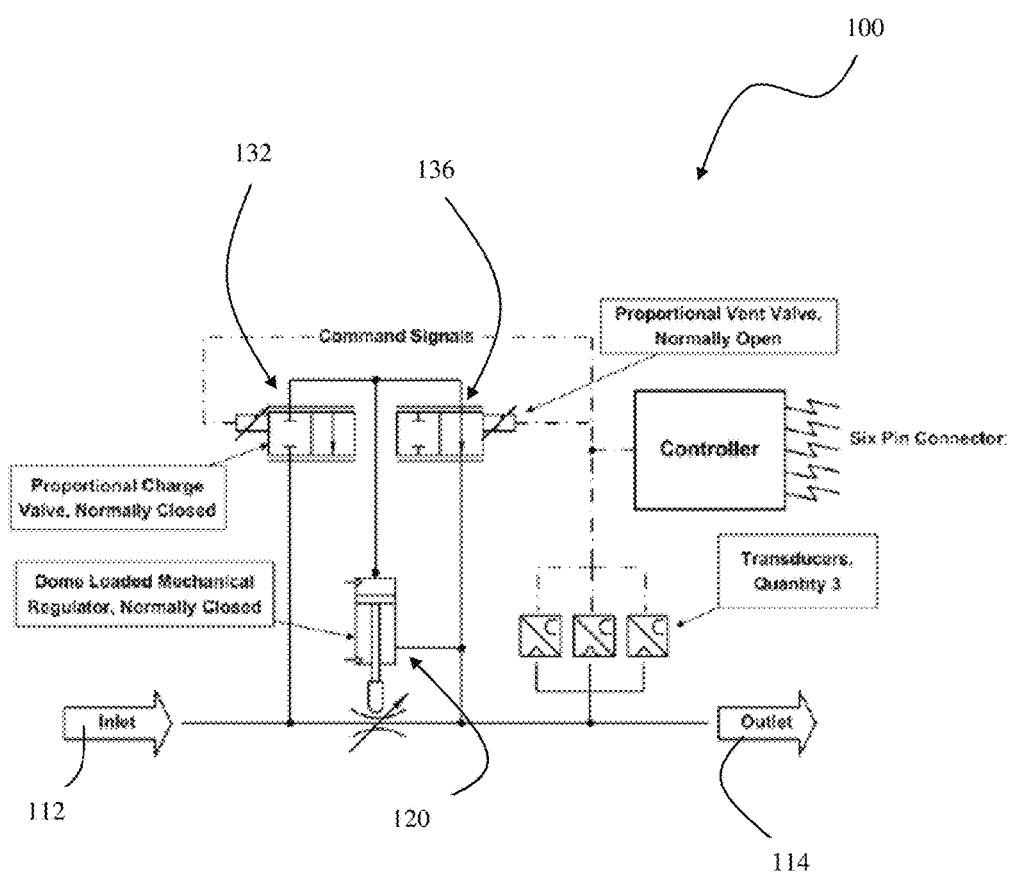
FIG. 3 is a schematic of a system including the regulator shown in FIG. 1

A simplified schematic of a system including regulator 100 is shown in FIG. 3. The system consists of dome loaded regulator 100 with two pilots, charge valve assembly 132 and vent valve assembly 136, that can increase or decrease dome pressure as needed during operation. The dome pilot valves 132, 136 are actuated by an electronic control system that constantly measures system output pressure and increases or decreases dome pressure as required to correct for output pressure error. To minimize/eliminate set point error or droop, regulator 100 adjusts dome pressure to adjust the mechanical equilibrium point of the system, as described above. As long as the output of regulator 100 is within an error band of outlet pressure, the system is inactive and functions as a traditional mechanical regulator. The system includes multiple transducers for built-in redundancy. Failure of one transducer will not result in the failure of the system, though failure of two or more transducers will close regulator 100. The system is easily customizable to a particular pressure, flow media, and flow rate by making minor changes to the control circuitry and/or mechanical design. The system interfaces with control systems through a 6-pin connector. The interface defining the pin out of the regulator can be standard, or may be modified to match particular requirements.

The system's error correction can be described as follows. If during operation output pressure approaches the upper error band, vent valve assembly 136 is proportionally opened, reducing output pressure. If during operation the output pressure approaches the lower error band, charge valve assembly 132 is proportionally opened, increasing dome pressure. With this system configuration the electronics control the mechanical equilibrium point of the system, but not the actual stability or dynamic response. This greatly simplifies the control circuit design.

Figure 4:
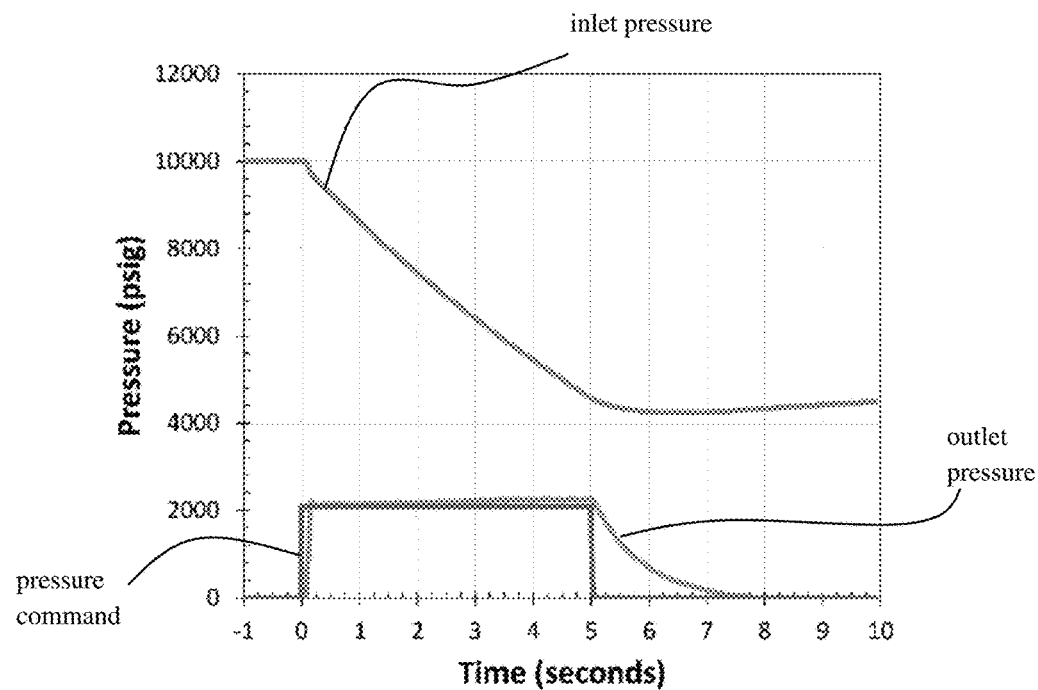
FIGS. 4 and 5 are graphs showing test results for a system including the regulator shown in FIG. 1.

An exemplary system including regulator 100 was operated to generate test data, which is plotted in FIG. 4. The operation involved an initial helium supply at 10,000 psi with a mass flow of about 0.4 lbm/s, and a command for the system to maintain an output pressure of 2100 psi. As shown in FIG. 4, as the inlet pressure drops to 4000 psi, mechanical set point error occurs. This can be seen as the gradual increase in output pressure with time. As output pressure increases toward the upper limit (which in this test was set to 2250 psi), the system corrects dome pressure and maintains output pressure within the control system setting.

The present system offers several advantages over traditional mechanical regulators. First, the system is flexible, in that outlet pressure can be linearly controlled by a 0.5 to 4.5V command signal, for example, which corresponds to outlet pressures of about 0 to 3000 psi. Of course greater inlet and outlet pressures can be accommodated by a regulator based on the presently described technology. The signal may be constant or varied during operation, depending on need. During operation, the system outputs system pressure as a 4 to 20 mA signal, for example, to a system controller. On the other hand, a mechanical regulator cannot change output set point during operation and does not inherently report output pressure.

The initial time for the system to reach set pressure and the amount of overshoot above set pressure can both be optimized to best meet need. Two methods of optimizing start transient are available. The first is for the system controller to vary the regulator set point when signal is applied. This ramp rate can be as slow as needed to minimize or eliminate initial overshoot. If a fast start is desired, full voltage can be applied. This will pressurize the dome as fast as mechanically possible, opening the system quickly. There will be some mechanical overshoot during the transient. Another option is to enable the system's integral "soft start" capability. Using built-in electronics, the full command signal is ramped internally at a desired rate, resulting in a smooth increase in set pressure without requiring a variable pressure command from the controller. Neither of these start transient optimization methods are possible with a mechanical regulator.

Figure 5:
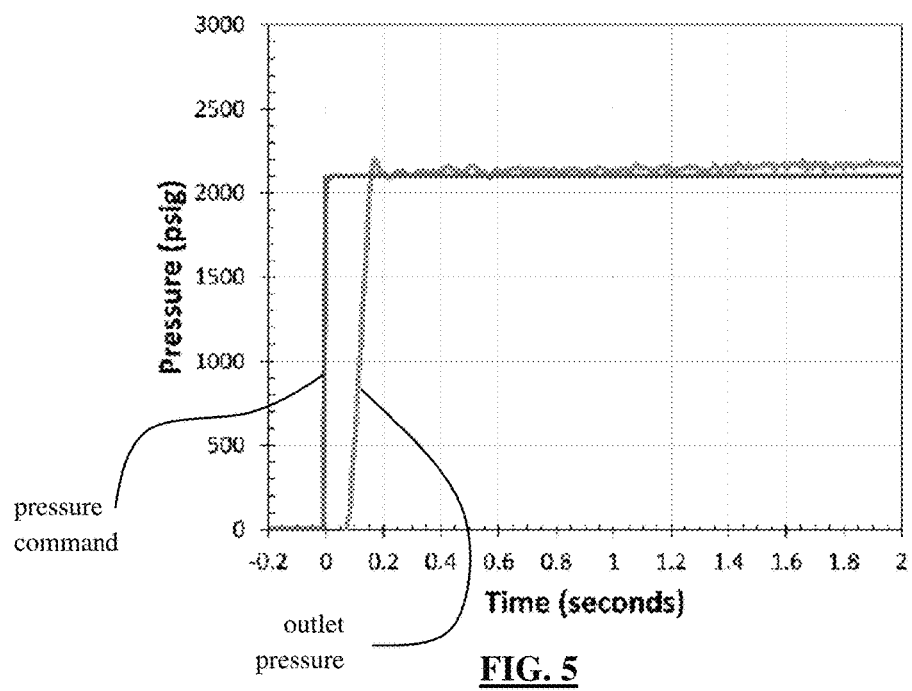

The exemplary system used to generate the test data shown in FIG. 4 was operated again to generate further test data, which is plotted in FIG. 5. The test parameters were the same in this example. The results are of a system start transient without any "soft start" features, i.e. of a fast start transient with overshoot. The external pressure command of 2100 psi is applied at time=0 seconds. The system starts to flow helium at time=0.07 seconds. Outlet pressure crosses set pressure at time=0.15 seconds. There is an overshoot to 2200 psi (5%) and then the system settles into steady state operation. The fast start transient has no "soft start," and therefore the regulator is limited by the rate the dome is filled and the mechanical response of the regulator. This will bring the system to full pressure in the shortest time possible, but with some overshoot and mechanical oscillation prior to settling down to steady state operation.

Another advantage offered by the present system over traditional mechanical regulators is reliability, which is inherent to the design of regulator 100. The reliability of the system is provided in several features. Regulator 100 is normally closed, so that if power or the command signal is lost, the dome will vent and regulator 100 will close. Three transducers provide redundancy by each constantly measuring outlet pressure. A voting circuit constantly checks transducer signal validity. If a single transducer fails, the system will ignore the bad transducer and continue to function nominally. If two or more transducers fail, the system will close and return a fault signal to the avionics or system controller. Any output pressure error (i.e., over range, no valid voting pairs, etc.) will result in a 2 mA pressure signal out, for example, allowing vehicle avionics to see the regulator error.

Another reliability factor is the voltage command structure, which can be dictated by the following exemplary parameters. A command signal less than 0.5 V tells the system to stay closed (set pressure is 0 psi). This range eliminates unintended system actuations from system noise. Commands above 4.5V will tell the system to regulate above 3000 psi, but in this instance the transducer outputs outside the 4.5V (3000 psi) range. The system interprets this as a transducer signal error, closing the regulator, resulting in the system limiting itself to a 3000 psi outlet pressure. Further, the system is reliable due to media compatibility. The system is designed to be compatible with earth-storable propellants, in particular Nitrogen Tetroxide ($N_2O_4$) and Monomethyl Hydrazine (MMH) and the like. This insures compatibility with almost all expected flow fluids or vapors. Different materials of construction can easily be substituted into the design depending on the application and need.

A further advantage that the present system offers over traditional mechanical regulators is based on its use of piezo-actuated pilots 132, 136. The charge and vent pilot valves are actuated by piezo actuators. In this application, piezo actuated valves have several advantages over traditional valve actuation technologies such as solenoids or DC stepper motors. First, they offer proportional valve response. Proportional pilot valve response enables accurate dome adjustments. When the system needs to adjust dome pressure to maintain output pressure, the system opens slightly, making a minor correction. A more traditional on-off solenoid valve would only be capable of full open or full closed and result in much larger corrections. Next, piezo actuators respond quickly. For this application, the piezo pilot valves are capable of moving from full closed to full open in less than 20 milliseconds. This fast response enables quick actuations, limiting correction overshoot. Stepper motors can be designed to respond at these speeds, but they require significant mass and power to reach these response rates. Solenoid actuators can respond at that rate, but they are not proportional. Further, piezo-actuated pilots consume minimal power. Power demands of piezo actuators are different than other actuation technologies. Piezo actuators use almost zero power when holding position. Only when moving do piezo actuators draw significant power. Contrasted to this, solenoid valves require significant power moving and holding position. Because of this feature of piezo actuators, piezo actuated pilots will draw less power and dissipate less heat than solenoid actuated pilots.

The system is modular and flexible, allowing optimization based on need. Main stage size, pilot design, pilot actuation, and/or transducer selection can be modified to meet certain requirements with minimal effort. As shown in FIG. 1, valve 120, charge valve assembly 132, dome 140, and vent valve assembly 136, among other possible components, are all components of regulator 100 that can be removed and replaced by similar components having different operating characteristics. This also allows a failed component to be replaced without affecting other usable components of the system.

Traditional regulator set point error or "droop" has been eliminated with the addition of a hybrid electronic-mechanical system that leverages the strengths of traditional mechanical regulator capabilities and electronic controls. The system offers a high value, flexible solution to many applications. This new product can be used as is or optimized for specific requirements.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An electronically-controlled pressure regulator, comprising:
   an inlet through which a gas or liquid is introduced at an inlet pressure;
   an outlet through which the gas or liquid exits at an outlet pressure;
   a valve disposed between the inlet and the outlet, the valve defining a passage including a throat and having a pintle with an enlarged shoulder, the valve movable between a closed configuration in which the enlarged shoulder seals the throat to prevent the gas or liquid from passing from the inlet to the outlet through the valve, and an open configuration in which the gas or liquid can pass from the inlet to the outlet through the valve; and
   a dome having a piston configured to contact the pintle for moving the valve from the closed configuration to the open configuration, wherein the piston has an annular deflection surface facing toward the pintle, wherein the annular deflection surface is a concave surface disposed within the outlet,
   wherein in a valve flow path that extends though the valve and from the inlet to the outlet, the enlarged shoulder is disposed between the inlet and the throat.

2. The regulator of claim 1, wherein when the gas or liquid flows into the valve, the valve is biased to the closed configuration.

3. The regulator of claim 1, further comprising:
   a charge valve assembly disposed between the inlet and the dome for supplying gas or liquid to the dome.

4. The regulator of claim 3, wherein a dome flow path that extends from the inlet to the dome is parallel to the valve flow path.

5. The regulator of claim 3, wherein the charge valve assembly is electronically-controlled and selectively opens to channel a portion of the gas or liquid from the inlet toward the dome.

6. The regulator of claim 3, further comprising a vent valve assembly disposed between the dome and the outlet for selectively permitting gas or liquid to pass from the dome to the outlet.

7. The regulator of claim 6, wherein the vent valve assembly is electronically-controlled and selectively opens to channel the gas or liquid from the dome to the outlet.

8. The regulator of claim 6, wherein all of the gas or liquid that enters through the inlet exits through the outlet.

9. The regulator of claim 6, wherein the regulator is closed to the environment between the inlet and the outlet.

10. The regulator of claim 6, further comprising a transducer in communication with the outlet to measure the outlet pressure.

11. The regulator of claim 3, wherein the pintle has a stem extending from the enlarged shoulder through the throat and configured to contact the piston of the dome.

12. The regulator of claim 1, wherein the dome includes a cylindrical wall defining a plurality of apertures therein.

13. The regulator of claim 1, wherein the valve includes a cylindrical wall defining the passage in the valve, the cylindrical wall having a plurality of apertures to filter the incoming gas or liquid.

14. An electronically-controlled pressure regulator, comprising:
- an inlet through which a gas or liquid is introduced at an inlet pressure;
- an outlet through which the gas or liquid exits at an outlet pressure;
- a valve disposed between the inlet and the outlet, the valve defining a passage including a throat and having a pintle with an enlarged shoulder, the valve movable between a closed configuration in which the enlarged shoulder seals the throat to prevent the gas or liquid from passing from the inlet to the outlet through the valve, and an open configuration in which the gas or liquid can pass from the inlet to the outlet through the valve;
- a dome having a piston configured to contact the pintle for moving the valve from the closed configuration to the open configuration, wherein the piston has an annular deflection surface facing toward the pintle, wherein the annular deflection surface is a concave surface disposed within the outlet; and
- a charge valve assembly disposed between the inlet and the dome for supplying gas or liquid to the dome,
- wherein all of the gas or liquid that enters through the inlet exits through the outlet.

15. The regulator of claim 14, further comprising a vent valve assembly disposed between the dome and the outlet for selectively permitting gas or liquid to pass from the dome to the outlet.

16. The regulator of claim 15, wherein the vent valve assembly is electronically-controlled and selectively opens to channel the gas or liquid from the dome to the outlet.

17. The regulator of claim 14, wherein the regulator is closed to the environment between the inlet and the outlet.

18. A hybrid mechanical-electronic pressure regulator, comprising:
- an inlet through which a gas or liquid is introduced at an inlet pressure;
- an outlet through which the gas or liquid exits at an outlet pressure;
- a valve disposed between the inlet and the outlet, the valve defining a passage including a throat and having a pintle with an enlarged shoulder, the valve movable between a closed configuration in which the enlarged shoulder seals the throat to prevent the gas or liquid from passing from the inlet to the outlet through the valve, and an open configuration in which the gas or liquid can pass from the inlet to the outlet through the valve;
- a dome having a piston configured to contact the pintle for moving the valve from the closed configuration to the open configuration, wherein the piston has an annular deflection surface facing toward the pintle, wherein the annular deflection surface is a concave surface disposed within the outlet;
- a charge valve assembly disposed between the inlet and the dome for supplying gas or liquid to the dome; and
- a vent valve assembly disposed between the dome and the outlet for selectively permitting gas or liquid to pass from the dome to the outlet,
- wherein the throat is defined by a collar of the valve that is movable within the regulator, such that the collar is self-centering when the gas or liquid flows into the valve.

19. The regulator of claim 1, wherein the throat is defined by a collar of the valve that is movable within the regulator, such that the collar is self-centering when the gas or liquid flows into the valve.

* * * * *